May 13, 1947.  J. STOIBER  2,420,628
DETECTIVE CAMERA
Filed Feb. 6, 1945
FIG. 1.
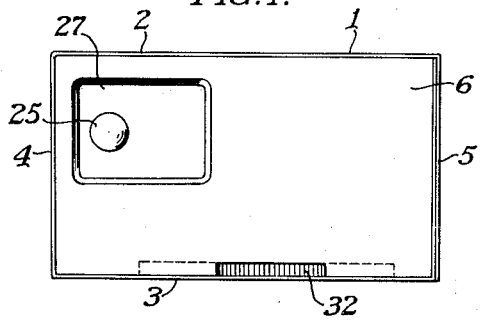
FIG. 3.
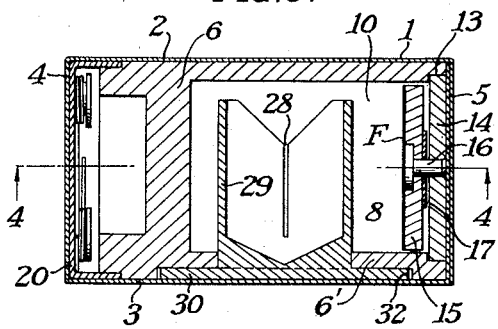
FIG. 2.
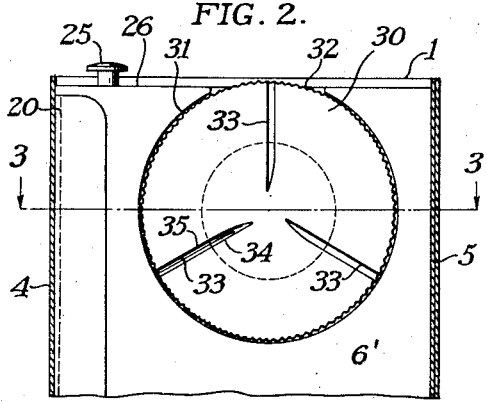
FIG. 4.
FIG. 5.
FIG. 6.
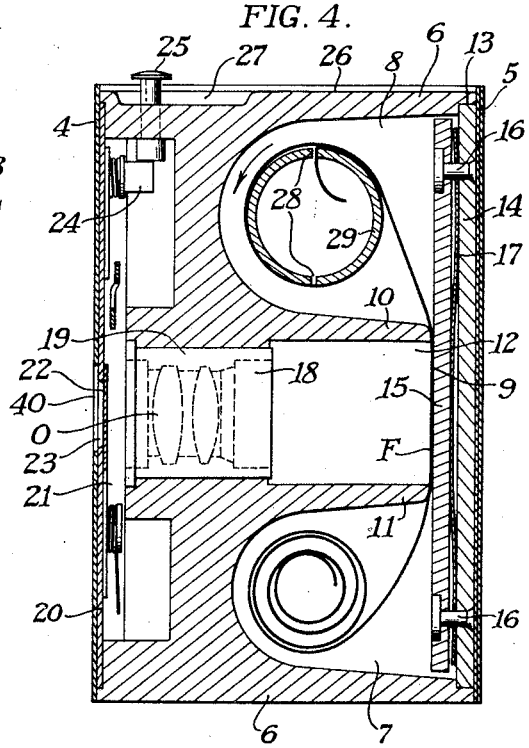
JOSEPH STOIBER
INVENTOR
BY
ATTORNEYS Patented May 13, 1947

2,420,628

UNITED STATES PATENT OFFICE 2,420,628

DETECTIVE CAMERA

Joseph Stoiber, Rochester, N. Y., assignor to Eastman Kodak Company, Rochester, N. Y., a corporation of New Jersey Application February 6, 1945, Serial No. 576,421

7 Claims. (Cl. 95—31)

This invention relates to cameras and particularly to small-sized cameras which can readily be concealed. One object of my invention is to provide an extremely compact camera which has all of the necessary elements to make high grade photographic negatives which may be enlarged many times. Another object of my invention is to provide a camera, the operable parts of which are so arranged that they may be readily used without attracting undue notice. Another object of my invention is to provide a novel type of camera body which particularly facilitates the manufacture of a compact and efficient photographic unit. Other objects will appear from the following specification, the novel features being particularly pointed out in the claims at the end thereof.

Coming now to the drawings wherein like reference characters denote like parts throughout:

Fig. 1 is an end elevation of a camera constructed in accordance with and illustrating a preferred embodiment of my invention;

Fig. 2 is a fragmentary bottom plan view of the inner casing of the camera shown in Fig. 1;

Fig. 3 is a section taken on line 3—3 of Fig. 2;

Fig. 4 is a transverse section on line 4—4 of Fig. 3;

Fig. 5 is a fragmentary detail section showing a portion of the outer camera casing in a position to prevent film winding; and Fig. 6 is an enlarged detail section taken on line 6—6 of Fig. 5.

My camera consists of two generally rectangular casing members, an inner casing member containing most of the operating parts of the camera and an outer casing member in which the inner casing member is mounted for sliding movement, this sliding movement permitting an operator to conceal or expose a film winding knob according to the position of the inner casing in the outer casing. The operating parts of the camera are arranged on the ends which are accessible through the open ends of the outer casing. The two parts generally resemble a matchbox in that the outer casing consists of four walls open at the ends. The inner casing is unlike the match receptacle of a matchbox and consists of a block carrying the camera parts as will now be described.

The preferred form of my camera includes an outer casing designated broadly as 1. This casing may comprise a top wall 2, a bottom wall 3 and edge walls 4 and 5. The two ends of the casing are left open and the inner casing member 6 may be slide into the outer casing.

The inner casing member 6 preferably comprises a block in which are formed a supply film chamber 7 and a take-up spool chamber 8, these two chambers being spaced from an exposure aperture 9 formed by walls 10 and 11 on the facing edges of the film chambers and spaced walls 12 extending between the walls 10 and 11. The inner casing member includes a rabbet 13 extending completely around the back of this casing member, this rabbet being to receive the edges of a backing plate 14 which closely fits the rabbet and forms a substantially light-tight connection therewith. The backing plate 14 carries a film pressure plate 15 slidably mounted on a pair of spaced studs 16. A leaf spring 17 also positioned by the studs 16 tends to press the film presser member 15 against the exposure frame and at the same time tends to press the backing plate 14 outwardly against the wall 5 of the outer casing, thus frictionally engaging the casing.

The leaf spring member 17 accomplishes the dual purpose of holding a film F flat on the exposure frame and holding the inner casing 6 in a set position in the outer casing 1 through its large frictional contact therewith.

An objective O is mounted in a suitable lens cell 18 carried in alignment with the exposure frame and lying in an opening 19 in the forward portion of the inner frame member 6. The front part of the inner frame member 6 consists of a plate 20 which forms a shutter cover for shutter mechanism 21 which includes a shutter leaf 22 normally covering an exposure opening 23 in the cover plate. The shutter mechanism may be operated through a lug 24 by means of a shutter trigger 25 mounted on an end wall 26 of the inner casing member and preferably lying in a recess 27 formed in this wall. Thus the inner casing member carries the camera parts and in order to load a film F therein the inner member 6 is slid through one open end in the outer casing 1 so that the cover plate 14 may be removed and a loose coil of film may then be placed in the supply chamber 7. The end of this film is drawn across the exposure aperture and is threaded into a slot 28 formed in the hub 29 which extends downwardly from a flat disk 30 adapted to lie in a recess 31 in a wall 6' of the inner casing member 6. The flat disk 30 is preferably provided with knurling 32 around its periphery and with a number of radially extending slots 33 which (as best shown in Fig. 6) are roughly triangular shaped in cross section having a substantially vertical wall 34 and having a slanting wall 35. A protuberance 36 approximately complemental in shape is carried by the wall 3 of the outer casing 1 and a slot 37 renders the strip of metal 38 carrying the protuberance 36 resilient so that it may snap into any one of the grooves 33. This constitutes the means for winding film since the spacing between the notches 33 is equal to one exposure area plus a comparatively small film area between exposures. When the operator turns the knurled ring 32 in the direction shown by the arrow in Fig. 4, a film area will be wound when the protuberance 36 snaps into the next radial slot 33. Thus the flat disk 30, the knurling 32 and the hub 29 constitutes a film winding knob which can only be actuated when a small area of the knurling projects from the casing 1 and into an operative position. This position can be secured by pressing on one end of the inner casing 6 to thrust the winding end of the inner casing a slight distance from the outer casing.

Such a structure of course does not compensate for the varying diameter of the film being wound on the hub 29, but nevertheless since this hub is of relatively large size and since the exposure aperture is of a relatively small size very little film is wasted with this winding mechanism. In order to better visualize the size of a preferred camera I might point out that the camera is shown approximately two times its size in the drawings, although obviously I do not wish to limit myself to any particular size of camera and am merely mentioning this as a preferred miniature matchbox size of camera.

The camera's outer casing 1 is provided with an aperture 40 in the front wall 4 which registers with the aperture 23 of the inner casing and which is in alignment with the objective O and the exposure frame. The aperture 40 is somewhat larger than the aperture 23 so that the inner casing 6 may be slid longitudinally of the outer casing 1 a short distance without in any way obstructing the registration of the two openings through which light may pass to the film F. This is desirable because I prefer to slide the inner casing a distance into the outer casing to prevent the knurled edge 32 of the winding key from being accidentally turned and also to prevent the trigger 25 from being accidentally depressed. With such a construction the inner casing may be slid relative to the outer casing to expose the knurling 32 and with little practice an operator can readily wind film by pressing on this knurling while the camera is concealed in a pocket.

Since the radial notches 33 have a sharp edge 34 for engagement with the protuberance 36 when the parts are in a locking relationship, as shown in Fig. 6, these edges will practically prevent the hub 29 from being turned in the incorrect direction and will readily allow the winding key to be turned in the proper direction for winding film F to present a fresh area for exposure.

When the camera is not in use the inner casing 6 may be pressed endwise through the outer casing 1 a distance to prevent the accidental operation of both the winding key 32 and the trigger 25.

The camera is extremely simple to both load and operate and, because of its size, can readily be concealed. It is primarily designed for loading in a dark room since in the preferred form shown I have not utilized the normal type of film spool with flanges for protecting the film against light. These may be employed if desired but since this camera is primarily intended for detective work it is even more convenient to provide it with loose coils of film which can be loaded in a dark room in the following manner. The camera body or inner casing member 6 is removed from the outer casing 1 by sliding it longitudinally thereof. The pressure of the leaf spring 17 on the backing plate 14 frictionally holds these parts together but permits the inner camera member to be slid from the outer member. The plate 14 is then thrust outwardly by the leaf spring 17 and the camera back as well as the film pressure pad 15 is removed. The exposed coil of film F carried by the tubular member 29 may then be slid axially off the tubular member and a fresh coil of film placed in the film chamber 7 threading the end of the film across the exposure aperture and into the slot 28 in the cylinder 29. The camera back 14 may then be placed on the inner member 6 and it may be slid into the outer casing 1. By sliding the inner casing so as to expose a knurled edge 32 of the winding key beyond the outer casing 1, the operator may then wind off two or three exposure areas and the camera is then ready for an exposure. This can be made while holding the camera to conceal it as much as possible and by pressing the trigger 25. This actuates the shutter blade 22 and makes an exposure. Exposures may be repeated until the film is used. It should be noticed that the working parts of this camera are carried by the inner casing member with the exception of the protuberance 36 which forms one element of a snap latch, the other element of which is a radial slot 33 of the winding disk 30. The exterior of the camera presents much the appearance of a matchbox and would attract but little attention. No finder is provided in the preferred form shown so that the camera may be operated in various positions without the operator watching the camera and thus directing attention to it.

While I have shown a preferred form of my invention it is obvious that various alterations and refinements may suggest themselves to those skilled in the art. I contemplate as within the scope of my invention all such forms as may come within the scope of the appended claims.

What I claim is:

1. A camera comprising, in combination, an outer generally rectangular casing open at the ends, an inner casing slidably mounted in the outer casing and including film chambers, an exposure frame, a film tensioning pad covering the exposure frame, a spring for holding the film tensioning pad against the exposure frame in an operative position, a film winding knob located at least partially between the inner and outer casings adjacent an open end of the outer casing, said inner and outer casings sliding a distance sufficient to expose at least a portion of the film winding knob, said outer casing holding the tensioning pad in its operative position during such movement.

2. A camera comprising, in combination, an outer generally rectangular casing open at the ends, an inner casing slidably mounted in the outer casing and including film chambers, an exposure frame, a film tensioning pad covering the exposure frame, a spring for holding the film tensioning pad against the exposure frame in an operative position, a film winding knob located at least partially between the inner and outer casings adjacent an open end of the outer casing, said inner and outer casings sliding a distance sufficient to expose at least a portion of the film winding knob, said outer casing holding the tensioning pad in its operative position during such movement, a shutter, trigger and objective carried by the inner casing, said trigger extending from the inner casing through an open end of the outer casing.

3. A camera comprising, in combination, an outer generally rectangular casing open at the ends, an inner casing slidably mounted in the outer casing and including film chambers, an exposure frame, a film tensioning pad covering the exposure frame, a spring for holding the film tensioning pad against the exposure frame in an operative position, a film winding knob located at least partially between the inner and outer casings adjacent an open end of the outer casing, said inner and outer casings sliding a distance sufficient to expose at least a portion of the film winding knob, said outer casing holding the tensioning pad in its operative position during such movement, a shutter, trigger and objective carried by the inner casing, said trigger extending from the inner casing through an open end of the outer casing, and a recess in the inner casing into which the trigger extends whereby said trigger may normally lie inside of the open end of the outer casing.

4. A camera, comprising in combination, an inner box-like rectangular casing including a lens, an exposure frame, spool chambers at each end of the exposure frame, a film-winding hub extending through the casing and a film-winding knob in the form of a flat disk, a recess in the casing in which the disk lies except for a portion thereof projecting beyond the end of the casing, and an outer casing in which the inner casing closely fits, said outer casing consisting of four walls open at the two ends, said inner casing being mounted to slide in the outer casing to project and retract that portion of the film-winding flat disk which projects from the inner casing.

5. A camera according to claim 4 in which cooperating notches and a protuberance carried by the outer casing and flat disk indicate an exposure area when said flat disk is turned, the shape of the protuberance and the notches restricting movement in one direction and permitting movement in the other direction.

6. A camera according to claim 4 in which there is a trigger recessed into the inner casing adjacent the flat disk and adapted to be protected against accidental operation by the walls of the outer casing when the inner and outer casings are relatively moved to a position in which the winding knob is inoperative.

7. A camera, comprising in combination, an inner box-like rectangular casing including a lens, an exposure frame, spool chambers at each end of the exposure frame, a film-winding hub extending through the casing and a film-winding knob in the form of a flat disk, a recess in the casing in which the disk lies except for a portion thereof projecting beyond the end of the casing, and an outer casing in which the inner casing closely fits, said outer casing consisting of four walls open at the two ends, said inner casing being mounted to slide in the outer casing to project and retract that portion of the film-winding flat disk which projects from the inner casing, a trigger recess in the inner casing, a trigger therein adjacent the film-winding disk, both the trigger and film-winding disk being movable together to and from an operative position outside of the outer casing by moving the inner casing longitudinally to the outer casing.

JOSEPH STOIBER.

REFERENCES CITED

The following references are of record in the file of this patent:

UNITED STATES PATENTS

| Number | Name | Date |
| --- | --- | --- |
| 2,102,574 | Reason, et al. | Dec. 14, 1937 |
| 2,046,580 | Premo | July 7, 1936 |
| 2,169,548 | Zapp | Aug. 15, 1939 |
| 1,291,452 | Farmer | Jan. 14, 1919 |
| 2,208,797 | Kende | July 23, 1940 |

FOREIGN PATENTS

| Number | Country | Date |
| --- | --- | --- |
| 6,932 | Great Britain | Sept. 28, 1908 |